United States Patent [19]
Nakamori

[11] Patent Number: 5,043,753
[45] Date of Patent: Aug. 27, 1991

[54] CAMERA SHUTTER BLADE DEVICE
[75] Inventor: Masao Nakamori, Tokyo, Japan
[73] Assignee: Copal Company Limited, Tokyo, Japan
[21] Appl. No.: 571,143
[22] Filed: Aug. 23, 1990
[30] Foreign Application Priority Data
  Sep. 1, 1989 [JP] Japan .................................. 64-226730
  Nov. 27, 1989 [JP] Japan .................................. 64-306961
[51] Int. Cl.⁵ ................................................ G03B 9/40
[52] U.S. Cl. .................................................... 354/247
[58] Field of Search ............... 354/247, 245, 246, 248, 354/249, 226, 250, 270, 274

[56] References Cited
U.S. PATENT DOCUMENTS
4,220,409 9/1980 Inoue .................................... 354/247
4,609,275 9/1986 Ishiguro .............................. 354/435

FOREIGN PATENT DOCUMENTS
53-9525 1/1978 Japan .
64-526 1/1989 Japan .
64-2028 1/1989 Japan .

Primary Examiner—L. T. Mix
Assistant Examiner—Howard B. Blankenship
Attorney, Agent, or Firm—Sixbey, Friedman, Leedom & Ferguson

[57] ABSTRACT

The camera shutter device has four blades disposed in overlapping relation to each other and comprised of a pair of dominant blades effective to cover a dominant part of an aperture and another pair of supplementary blades effective to cover the remaining part of the aperture. A shutter substrate has a central section formed with the aperture and a pair of peripheral sections disposed in symmetrical relation to each other with respect to the aperture. A first support mechanism is disposed on one of the peripheral sections for rotatably supporting a first group of two blades selected from the four blades on the substrate. A second support mechanism is disposed on the other of the peripheral sections for rotatably supporting a second group composed of the two remaining blades on the substrate. An operating mechanism is disposed on the substrate for operating the first and second groups of blades simultaneously with each other to slide the four blades relative to the aperture to thereby effect opening and closing of the aperture.

8 Claims, 10 Drawing Sheets

CAMERA SHUTTER BLADE DEVICE

BACKGROUND OF THE INVENTION

The present invention relates to a shutter blade device for use as a shutter of a compact camera or an iris stop, and more specifically relates to a device of the type having a plurality of blades disposed slidably over an aperture to move from the aperture in opposite directions. The blades are superposed successively to cover the aperture.

The conventional compact camera is provided with a shutter device of the type having a pair of blades slidable relative to a lens aperture in opposite directions to one another to effect opening and closing of the aperture. This type of the shutter device is operative to control an opening time interval and an opening diameter by their blades and has relatively small size and light weight suitable for use in the compact camera. However, this type of the shutter device is needed to use a pair of blades of relatively great dimension to cover an aperture having a relatively great diameter effective to reduce F number of lens system in the compact camera. In such case, the pair of blades are stored on opposite sides of the lens aperture so as to open the aperture The greater the dimension of each blade, the more the planar spacing for storing each blade within an outer boundary of the device, thereby causing a drawback that the outer diameter of the device is enlarged.

In view of the above noted drawback of the two-blade type shutter device, there has been proposed another type of the shutter blade device as disclosed, for example, in Japanese Patent Laid-Open Application No. 526/1989. This type of the shutter device is designed such as to facilitate enlargement of a lens aperture diameter to reduce F number without enlarging an outer diameter of the shutter device. Namely, this type of the shutter device is provided with two pairs of blades such that each pair is comprised of an inner blade and an outer blade, and one pair corresponds to one blade of the first-mentioned conventional shutter device. The four blades are overlapped with each other to completely close the lens aperture, and the respective pairs are stored in superposed relation on opposite sides of an annular area around the lens aperture within an outer periphery of the shutter device structure. Stated otherwise, one blade is divided into the inner and outer blade sections to enable compact storage of the two blade sections in the superposed relation.

However, in the shutter device disclosed in Japanese Patent Laid-Open Application No. 526/1989, the four shutter blades are pivotably supported around a common shaft pin on a periphery of the lens aperture. The respective blades are slidably driven by four operating pins. The four operating pins are disposed adjacently to each other so that the respective blades have a complicated shape formed with recesses so as to escape movement passe of the operating pins closely arranged with each other. Therefore, design freedom of shutter blade shape is unduly restricted. Further, the four blades are rotated around the common shaft pin in opposite directions relative to the lens aperture to define an effective opening bordered by the opposed inner edges of the separating blades. However, the shape of the effective opening is distorted from a circle, thereby causing a drawback that exposure amount of the shutter cannot be controlled accurately.

SUMMARY OF THE INVENTION

In view of the above noted drawbacks of the prior art shutter, an object of the present invention is to provide an improved shutter blade device having a simplified shape of blades to facilitate shape design of the blades and to realize substantially circular effective opening.

In order to achieve the above object, the inventive camera shutter blade device has four blades disposed in overlapping relation to each other and comprised of a pair of dominant blades effective to cover a dominant part of an aperture and another pair of supplementary blades effective to cover the remaining part of the aperture.

A shutter substrate has a central section formed with the aperture and a pair of peripheral sections disposed in symmetrical relation to each other with respect to the aperture. A first support mechanism is disposed on one of the peripheral sections for rotatably supporting a first group of two blades selected from the four blades on the substrate. A second support mechanism is disposed on the other of the peripheral sections for rotatably supporting a second group composed of the two remaining blades on the substrate. An operating mechanism is disposed on the substrate for operating the first and second groups of blades simultaneously with each other to slide the four blades relative to the aperture to thereby effect opening and closing of the aperture According to the first aspect of the invention, the first support mechanism has a common support member for rotatably supporting a first group composed of one dominant blade and one supplementary blade to enable the first group to slide away from the aperture in one direction, and the second support mechanism has another common support member for rotatably supporting a second group composed of the other dominant blade and the other supplementary blade to enable the second group to slide away from the aperture in another direction.

According to the second aspect of the invention, the first support mechanism has a pair of support members spaced from each other for rotatably supporting a first group composed of the pair of dominant blades to enable the dominant blades to slide away from the aperture in opposite directions, and the second support mechanism has another pair of support members spaced from each other for rotatably supporting a second group composed of the pair of supplementary blades to enable the supplementary blades to slide away from the aperture in opposite directions.

By such construction of the inventive shutter device, the four blades are initially overlapped with each other to close the lens aperture completely. When actuating the operating mechanism forwardly in this state, the first and second groups of four blades are simultaneously operated to slide away from the lens aperture. Consequently, the aperture is made open to effect exposure operation. Further, the operating mechanism is reversely actuated to return from the open state to the closed state. By these sequential drivings, the lens aperture is opened and closed each exposure operation of the camera.

DETAILED DESCRIPTION OF PREFERRED EMBODIMENTS

Figure 1A:
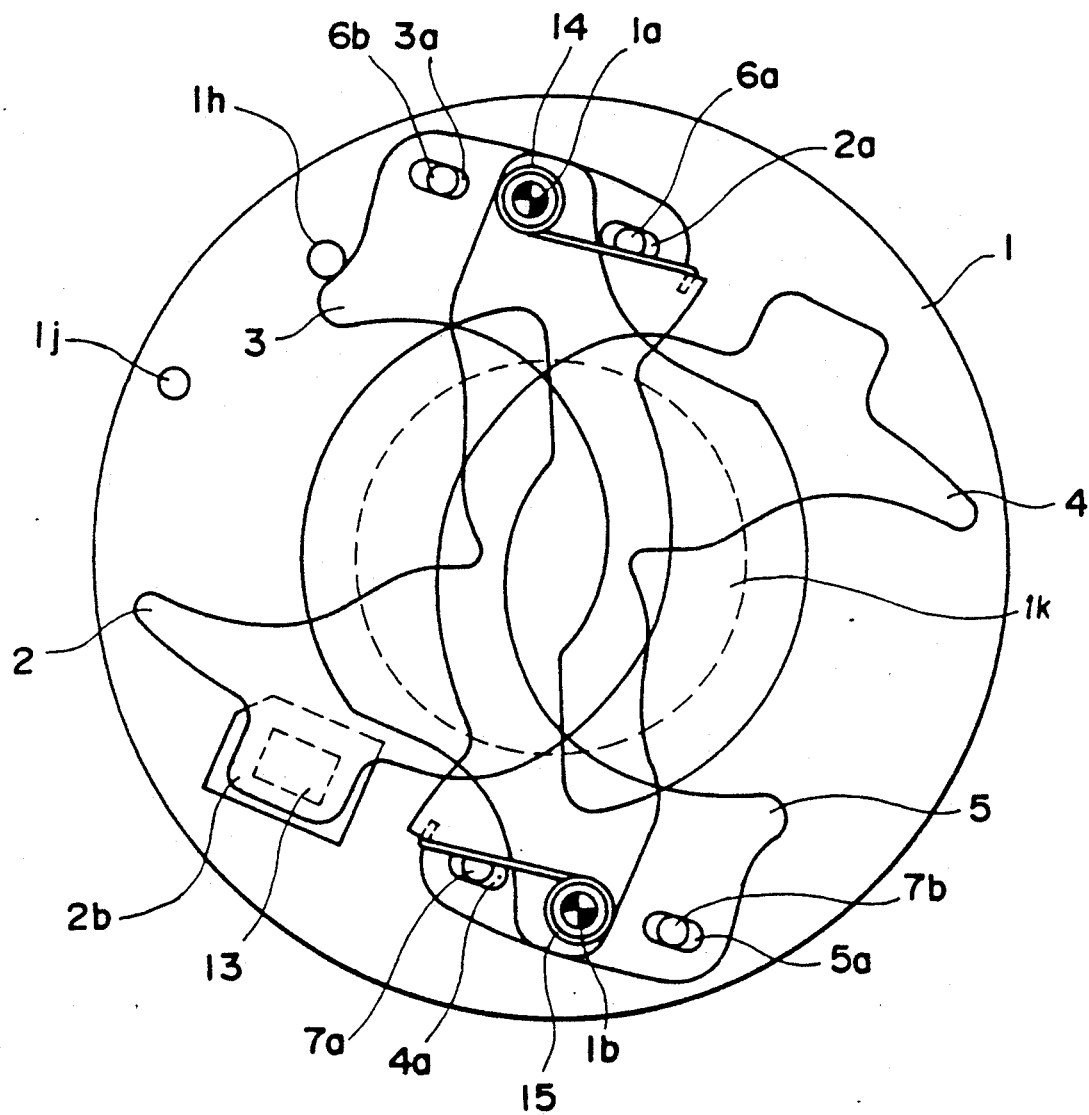
FIG. 1A is a front plan view of the shutter blade device in the closed state.

FIG. 1A is a front plan view of the inventive shutter device in the closed state. A shutter frame in the form of an annular substrate 1 is provided on its one peripheral portion with a first support mechanism including a first shaft pin 1a, and provided on its opposite peripheral portion with a second support mechanism including a second shaft pin 1b. The substrate 1 is further formed on its central portion with a lens aperture 1k. The first and second shaft pins 1a and 1b are arranged generally in symmetrical relation to each other with respect to an optical axis passing a center of the lens aperture 1k. The first shaft pin 1a or first support member rotatably supports a first group of two blades. The first group is composed of one dominant blade 2 effective to cover a dominant part of the aperture and displaceable through a greater angular distance to determine a variable effective opening size, and one supplementary blade 3 effective to cover the remaining part of the aperture not covered by the dominant blade 2 and displaceable through a smaller angular distance. On the other hand, the second shaft pin 1b or support member rotationally supports a second group of the two remaining blades. The second group is likewise composed of another dominant blade 4 and another supplementary blade 5. The dominant blades 2 and 4 have the same shape, and the supplementary blades 3 and 5 have the sam shape. These four blades are overlapped with each other to completely close the lens aperture 1k.

The dominant blade 2 is formed with a slot 2a a predetermined distance from the first shaft pin 1a. The slot 2a is engaged with an operating pin 6a which extends through the substrate 1. The supplementary blade 3 is also formed with a slot 3a a predetermined distance from the common first shaft pin 1a. The slot 3a is engaged with another operating pin 6b which extends through the substrate 1. These operating pins 6a and 6b cooperate to rotate the dominant blade 2 and supplementary blade 3 around the first shaft pin 1a. The dominant blade 2 rotates through an angular distance set greater than that of the supplementary blade 3.

In similar manner, the other dominant blade 4 of the second group is formed with a slot 4a to which a corresponding operating pin 7a is engaged through the substrate 1, and the other supplementary blade 5 of the second group is formed with a slot 5a to which another operating pin 7b is connected through the substrate 1. The operating pins 7a and 7b cooperate to rotate the dominant blade 4 and supplementary blade 5 around the common second shaft pin 1b. The dominant blade 4 likewise has an angular shift span greater than that of the supplementary blade 5.

A spring piece 14 is wound around the first shaft pin 1a and its one end acts on the dominant blade 2 to bias the same in its closing direction. Another spring piece 15 is wound around the second shaft pin 1b and its one end likewise acts on the other dominant blade 4 to bias the same in its closing direction.

The dominant blade 2 is formed with a tongue 2b to normally cover a window formed in the substrate 1. The tongue 2b is coated with an optically reflective film, and a photosensor 13 is arranged in opposed relation to the optically reflective film to constitute therewith a photointerrupter of the reflection type.

A stop pin 1h is erected on a peripheral surface portion of the substrate 1 to limit the closing rotation of the supplementary blade 3. Another stop pin 1j is also erected to limit the opening rotation of the dominant blade 4.

Figure 1B:
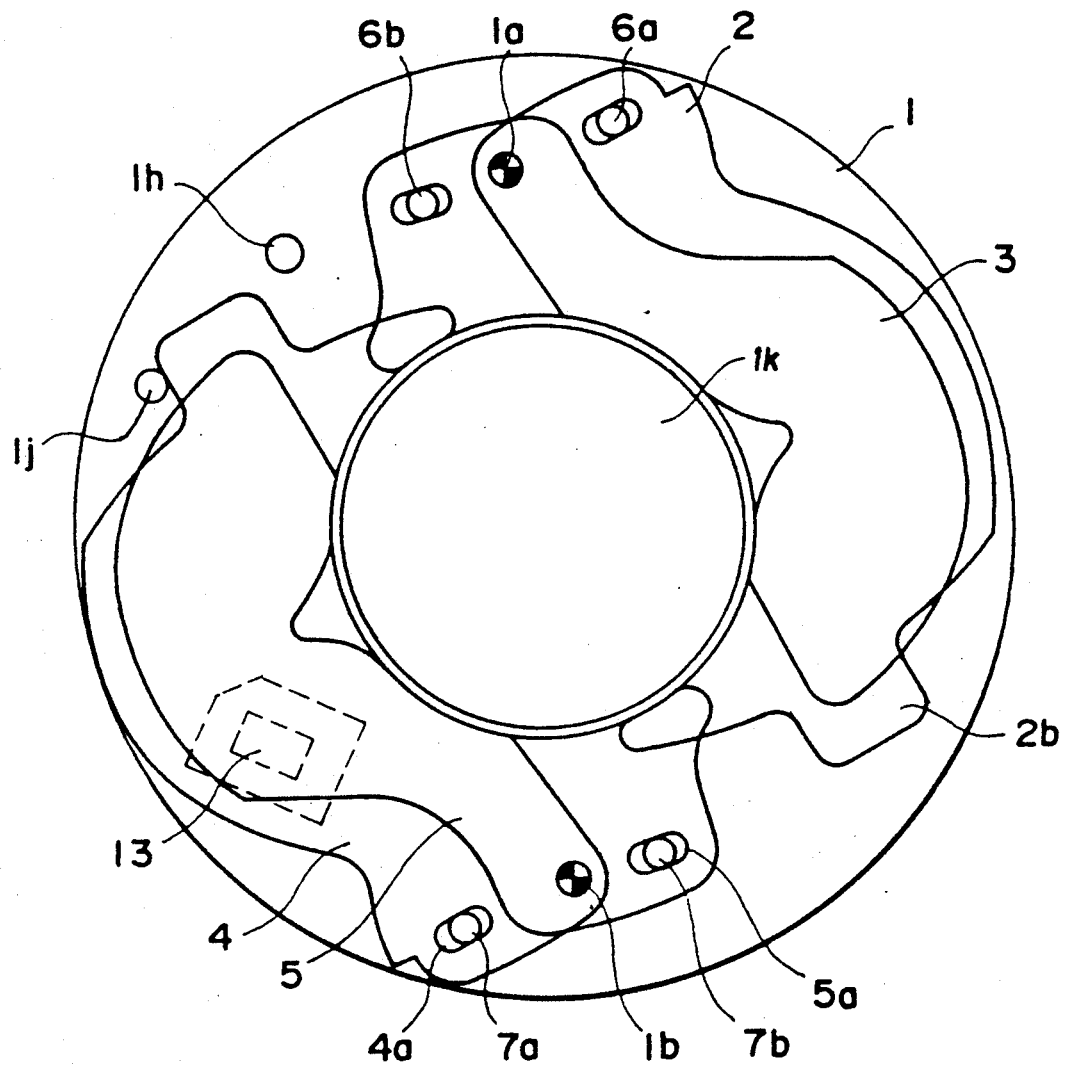
FIG. 1B is another front plan view of the same shutter blade device in the open state.

FIG. 1B is a front plan view of the same camera shutter device in the open state. However, the spring pieces 14 and 15 are eliminated for the simplicity. As shown in the figure, the dominant blade 2 and the supplementary blade 3 of the first group have been counterclockwise rotated around the first shaft pin 1a by means of the corresponding operating pins 6a and 6b to shift away from the aperture 1k in one direction. Namely, the first group blades are stored on a peripheral portion of the substrate 1 in superposed relation to one another. In turn, the dominant blade 4 and supplementary blade 5 of the second group have been rotated simultaneously counterclockwise around the second shaft pin 1b by means of the operating pins 7a and 7b. Namely, the second group is shifted away from the aperture in another direction and is stored on another peripheral portion of the substrate 1 in generally superposed relation to each other.

Figure 2A:
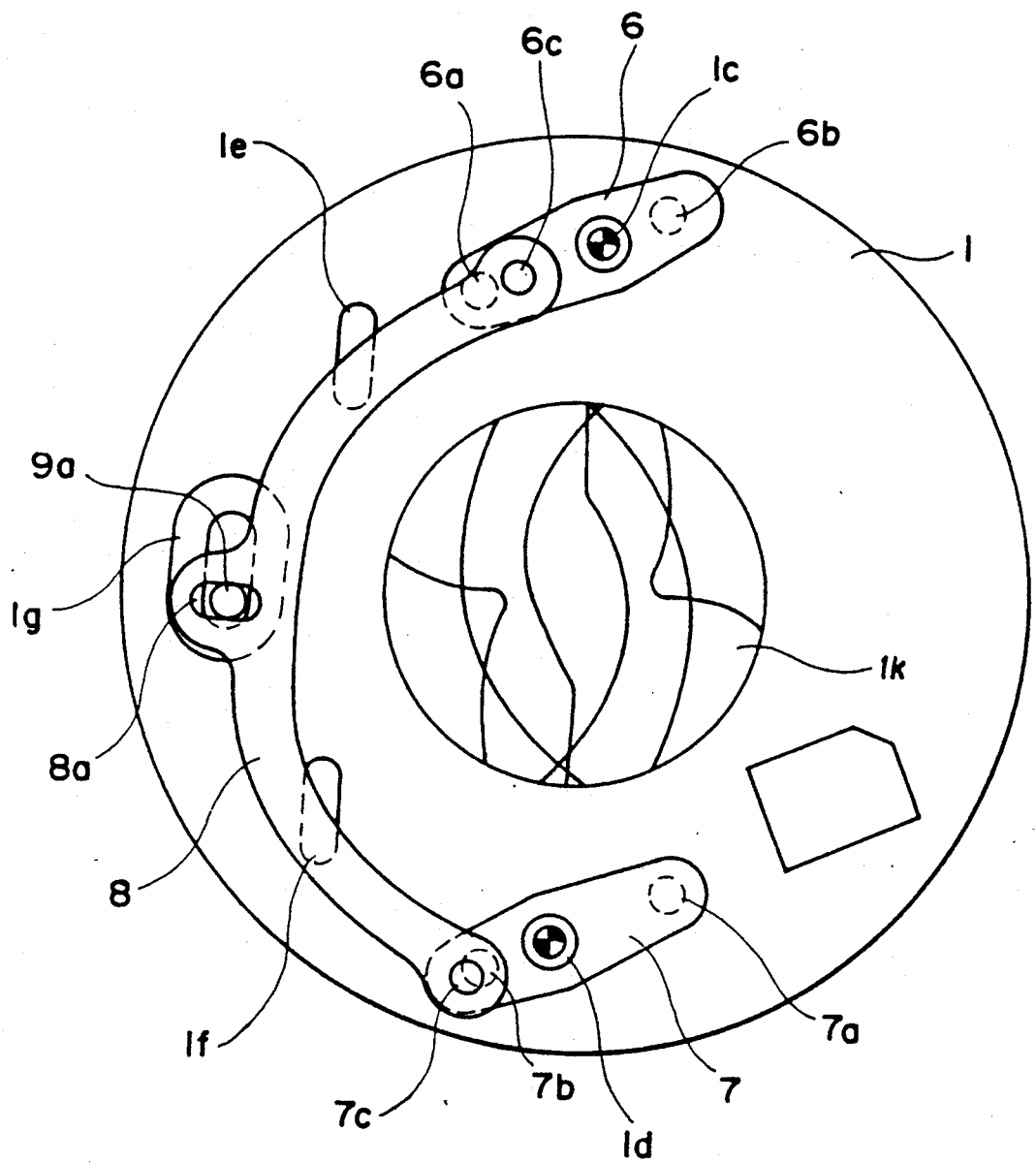
FIG. 2A is a rear plan view of the same shutter blade device in the closed state.
Figure 2:
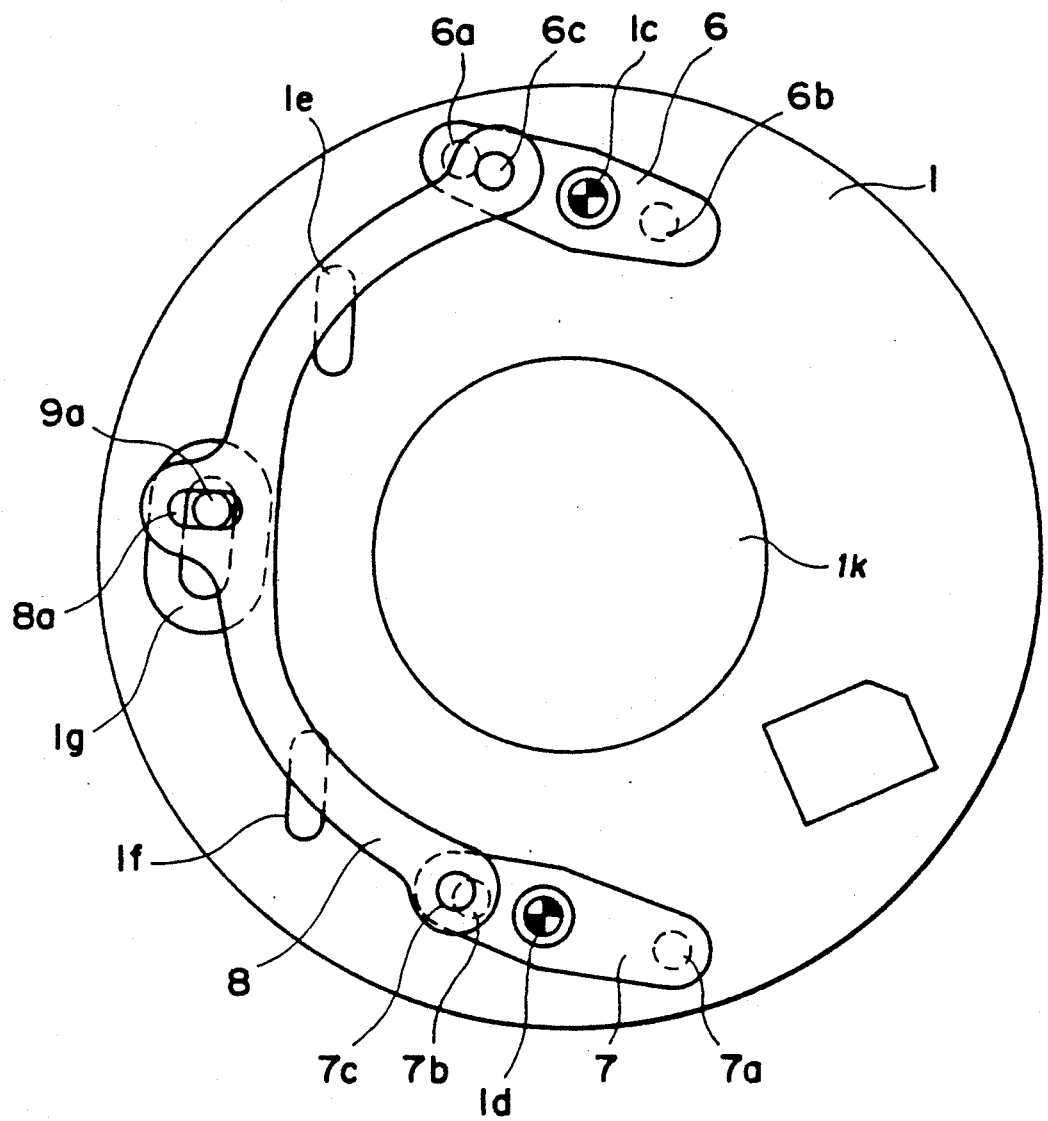
FIG. 2B is another rear plan view of the same shutter blade device in the open state.

FIG. 2A is a rear plan view of the same shutter device in the closed state, i.e., viewed from the back side of the substrate 1. A pivot pin 1c is disposed on a periphery of the substrate rear surface, and a first operating lever 6 is pivotably engaged with the pivot pin 1c. The first operating lever 6 supports at its opposite end portions the operating pins 6a and 6b, respectively, such that the operating pin 6a extends through the substrate 1 to engage with the slot 2a formed in the dominant blade 2 and the other operating pin 6b extends through the substrate 1 to engage with the slot 3a formed in the supplementary blade 3. Another pivot pin 1d is disposed on a periphery of the substrate oppositely to the pivot pin 1c with respect to the aperture 1k. A second operating lever 7 is pivotably supported by the pivot pin 1d. The second operating lever 7 supports at its opposite end portions the operating pins 7a and 7b, respectively, such that the operating pin 7a extends through the substrate 1 to engage with the slot 4a of the dominant blade 4 and the other operating pin 7b extends through the substrate 1 to engage with the slot 5a of the supplementary blade 5. The first operating lever 6 is provided at its one end portion with a link pin 6c erecting oppositely to the operating pin 6a. The second operating lever 7 is also provided at its one end portion with a link pin 7c erecting oppositely to the operating pin 7b. A link member 8 of an arcuate shape is connected between the pair of link pins 6c and 7c. The link member 8 is formed at its central portion with a slot 8a. The slot 8a receives a drive pin 9a of a drive source (not shown). The drive pin 9a moves upward and downward in the figure.

The substrate 1 is formed at its rear surface with protrusions 1e, 1f and 1g along an under face of the link member 8 to support the same. The link member 8 is displaced upward and downward by actuating the drive pin 9a so that the first and second operating levers 6 and 7 are simultaneously pivoted around the respective pivot pins. Namely, the first and second operating levers 6, 7 and the link member 8 constitute a so-called parallel link mechanism.

FIG. 2B is another rear plan view of the same shutter device in the open state, i.e., viewed from the back side of the substrate 1 shown in FIG. 1B. The four blades are completely shifted away from the aperture 1k. In the shutter open state, the link member 8 is displaced upward in the figure by means of the drive pin 9a so that the first and second operating levers 6, 7 are rotated clockwise around the corresponding pivot pins 1c, 1d. Consequently to this rotation, the operating pins 6a, 6b, 7a and 7b fixed to the operating levers 6, 7 are simultaneously displaced to act on the shutter blades to open the aperture.

Figure 3A:
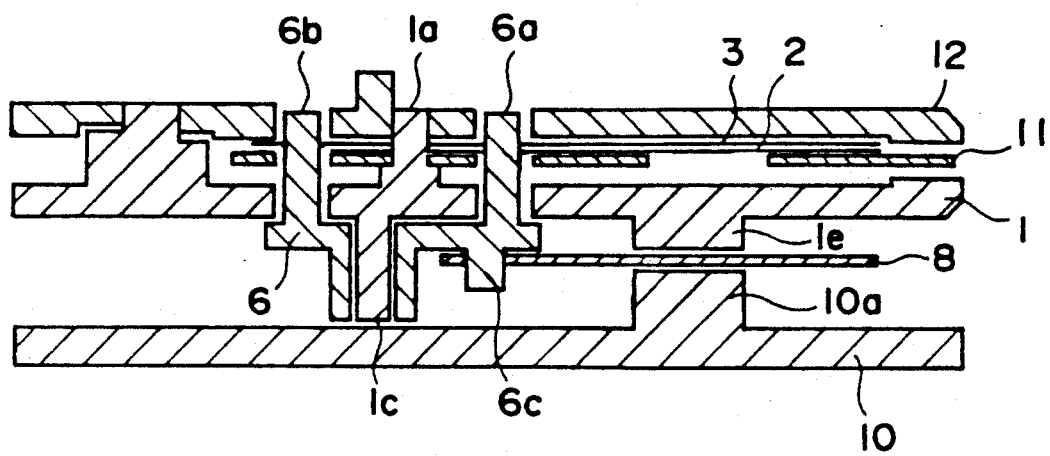
FIG. 3A is a sectional view of the same shutter blade device, taken along the line connecting a pair of operating pins.

FIG. 3A is a sectional view of the same shutter device, taken along the line passing through the operating pins 6a and 6b. The shutter device is constructed of three plate members superposed with each other. Namely, a shutter top frame 12 is disposed on the front surface of the substrate 1 and a link guide plate 10 is disposed on the rear surface of the substrate 1. An intermediate partition plate 11 is interposed between the substrate 1 and the top frame 12 to separate the first group of dominant blade 2 and supplementary blade 3, and the second group (not shown) of dominant blade 4 and supplementary blade 5 from each other. The intermediate partition plate 11 is inserted between the blade groups to avoid interference among the blades during the course of shifting or sliding. The dominant blade 2 and the supplementary blade 3 are supported rotatably by the common shaft pin 1a which erects on the substrate 1 The operating pin 6a engages with the slot formed in the dominant blade 2 and the other operating pin 6b engages with the slot formed in the supplementary blade 3. The pivot pin 1c erects on the rear face of the substrate 1 so as to pivotably support the operating lever 6. The link member 8 is interposed between the substrate 1 and the link guide plate 10, and is connected at its one end to the link pin 6c of the operating lever 6. The link member 8 is supported by the protrusion 1e formed on the substrate 1 and by a protrusion 10a formed on the link guide plate 10 from the opposite faces so as to suppress floating of the link member 8.

As described before, the dominant blade 2 has a slide angle $\theta_1$ set greater than another slide angle $\theta_2$ of the supplementary blade 3 in order to slide away from the aperture 1k and to store the pair of blades 2, 3 in generally superposed relation on a periphery of the substrate. For this, as shown in FIG. 3A, the pivot pin 1c of the lever 6 is deviated eccentrically from the shaft pin 1a of the blades 2, 3 toward the operating pin 6b by a predetermined deviation amount. The positions of operating pins 6a, 6b and the deviation amount are properly set to satisfy the condition $\theta_1 > \theta_2$. For example, the operating pin 6a and the shaft pin 1a are located a distance 2.5 (hereinafter, the distance is measured in terms of relative scale), and the operating pin 6b and the shaft pin 1a are located a distance 3.0. Further, the pivot pin 1c is deviated from the shaft pin 1a by a distance 1.0 toward the operating pin 6b. Therefore, the operating pin 6a is disposed a distance 3.5 from the pivot pin 16c, and the other operating pin 6b is disposed a distance 2.0 from the pivot pin 1c.

In the above arrangement, the operating lever 6 is actuated such that the operating pin 6a is pivoted a maximum angle $\alpha$ around the pivot pin 1c so as to operate the dominant blade 2. Concurrently, the other pin 6b is also pivoted the same angle $\alpha$ around the pivot pin 1c so as to operate the supplementary blade 3. At this sequence, the operating pin 6a is closer to the shaft pin 1a than to the pivot pin 1c so that the dominant blade 2 is rotated around the shaft pin 1a through the slide angle $\theta_1$ which is greater than the pivot angle $\alpha$. On the other hand, the operating pin 6b is farther from the shaft pin 1a than from the pivot pin 1c so that the supplementary blade 3 is rotated around the shaft pin 1a through the slide angle $\theta_2$ which is smaller than the pivot angle $\alpha$, thereby establishing the condition $\theta_1 > \theta_2$. Namely, the relative distance is adequately selected between the shaft pin 1a and the pivot pin 1c so as to determine desired slide angles of the blades.

Figure 3B:
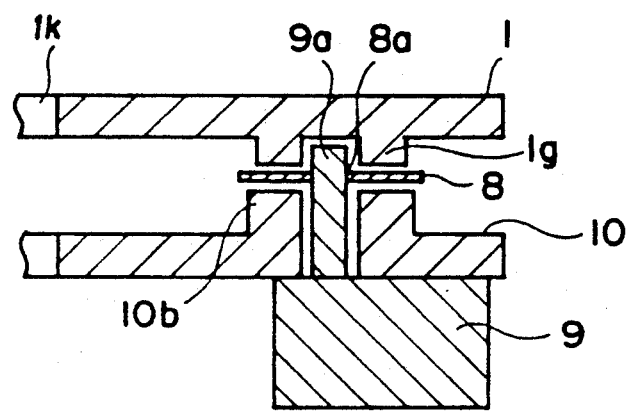
FIG. 3B is another sectional view of the same shutter blade device, taken along the line connecting a center of the aperture and a driving pins.

FIG. 3B is a partial sectional view of the same shutter device, taken along the line through the center of the aperture 1k and the drive pin 9a. The link member 8 is supported from the top and bottom sides thereof by the protrusion 1g of a flat ring shape formed on the substrate 1 and by the opposite protrusion 10b formed on the link guide plate 10 so as to avoid floating of the link member 8. The link member 8 is coupled at its central slot 8a to the drive pin 9a which extends through the link guide plate 10. The drive pin 9a is actuated by a drive source 9. The drive source 9 is composed of a stepping motor or moving magnet actuator. The drive source 9 may be preferably of small size and therefore can be mounted within the outer border of the substrate 1.

The next description is given for the operation of the shutter blade device. In the closed state, the drive source 9 is initiated such that the drive pin 9a starts to move to drive the link member 8. Consequently, the first and second operating levers 6, 7 start to pivot concurrently in the same direction so as to slide the four blades 2–5 in the opening direction. The first and second blade groups start to leave away from the aperture 1k in the opposite directions. At this time, the photosensor 13 detects displacement of the tongue 2b to generate an opening signal A control circuit (not shown) operates in response to the opening signal to count a given exposure interval determined according to brightness of an object, and then to generate a closing signal after completion of the exposure interval counting. The drive source 9 is switched to the reverse direction in response to the closing signal to move the drive pin 9a reversely. Consequently, the link member 8 is reversed such that the first and second operating levers 6, 7 concurrently pivot reversely. As a result, the operating pins 6a, 6b, 7a and 7b act reversely on the four blades 2–5 in the closing direction to thereby close the aperture 1k to finish the exposure.

Figure 4:
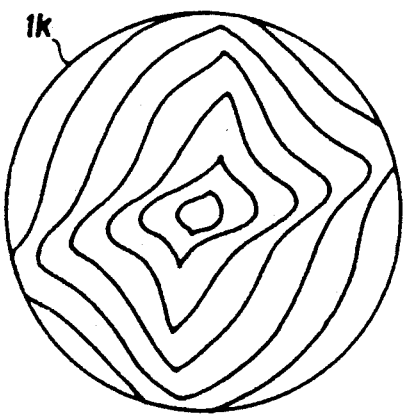
FIG. 4 is an illustrative diagram showing an opening shape of the same shutter blade device.

FIG. 4 shows change an effective opening shape in the aperture 1k during the course of sliding operation of the blades in the opening direction. As seen from the figure, the opening shape is closer to a circle than that of the conventional shutter blade device.

According to the present invention, the first and second blade groups are rotatably supported at the opposite sides with respect to the lens aperture such that the shutter blades can be stored compactly as compared to the conventional shutter blade device. Stated otherwise, according to the invention, an aperture diameter can be enlarged while a substrate outer diameter can be reduced as compared to the prior art. Further, the first and second groups are separately supported rotatably on opposite sides of the aperture and therefore the corresponding operating pins can be also separated to concurrently operate the blades. Accordingly, it would not be necessary to form recesses of complicated shape in the shutter blades so as to escape the operating pins as opposed to the prior art. Moreover, the first and second blade groups are arranged symmetrically to each other with respect to the aperture so that the effective opening shape can be formed by the shifting blades, closer to a circle shape as compared to the prior art.

Figure 5A:
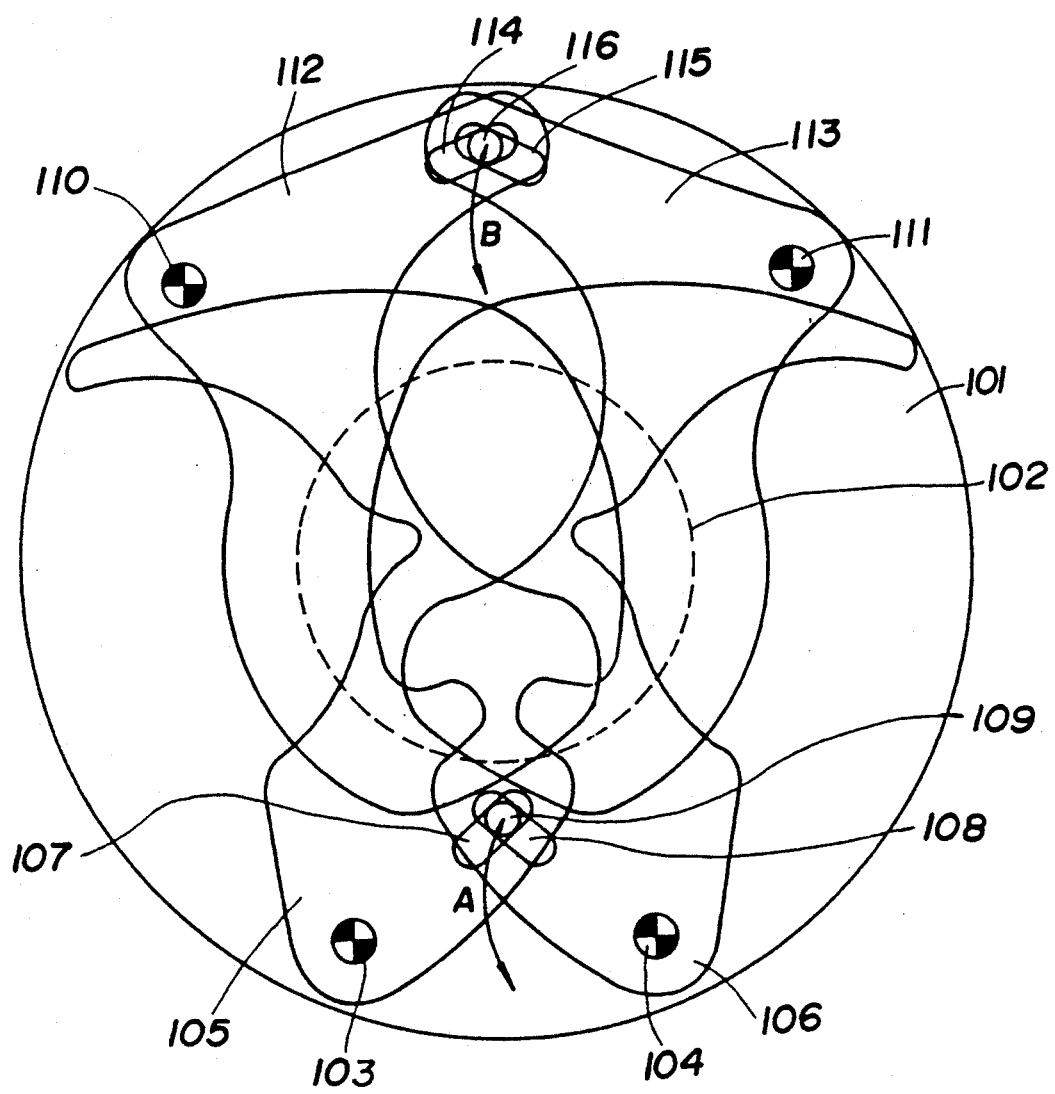
FIG. 5A is a front plan view of another embodiment of the shutter blade device in the closed state.
Figure 5:
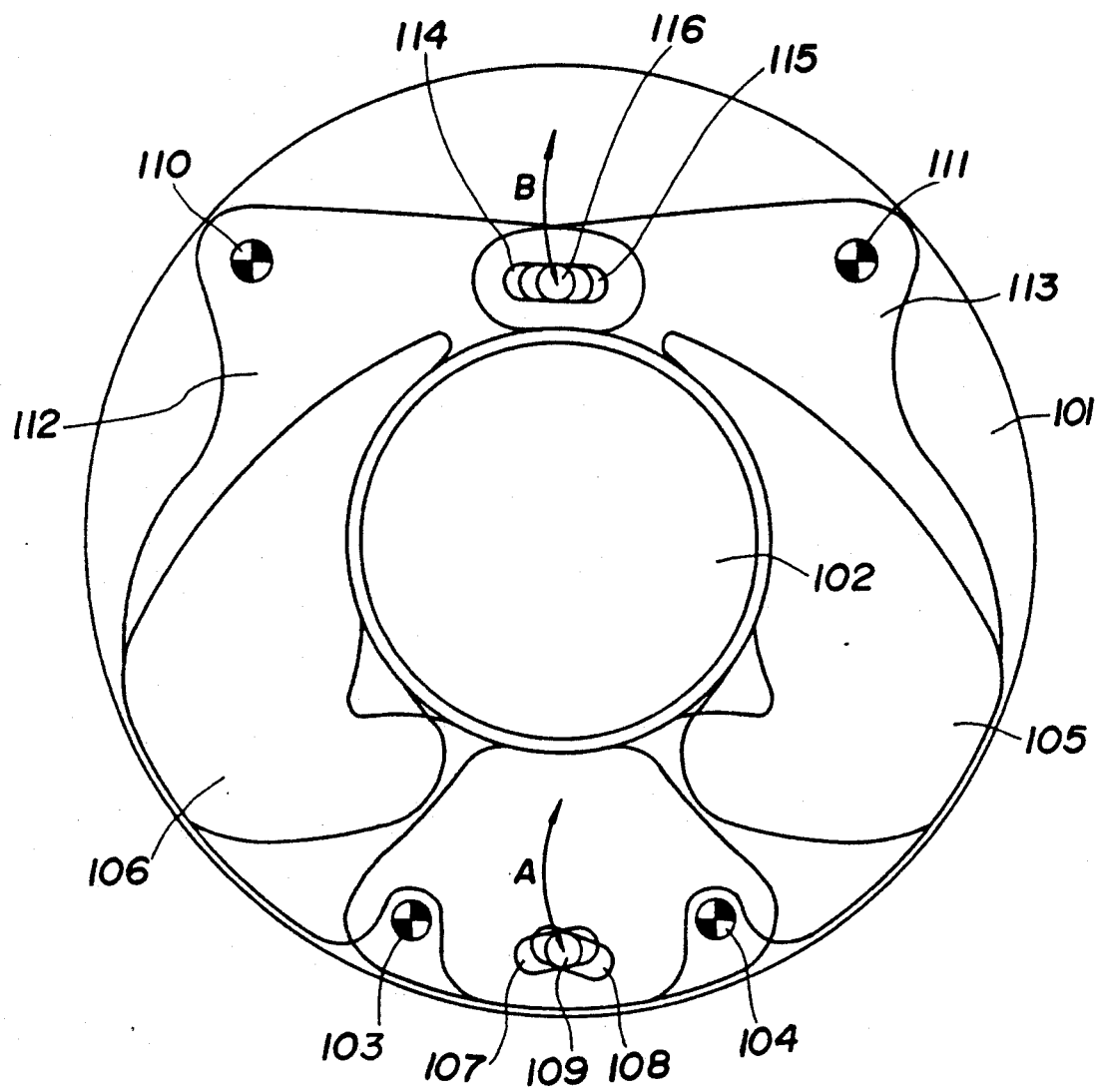
FIG. 5B is another front plan view of the same shutter blade device in the open state.

Another embodiment of the invention is next described in detail with reference to FIGS. 5A–7B. In the following description, terms "upper", "lower", "left" and "right" are used to indicate name, position and moving direction of various components. These terms are determined with reference to a front plan view of the shutter device, and are utilized for convenience of the description in conjunction with the drawings. Therefore, these terms are not limitative of the actual construction of the products. FIG. 5A is a front plan view of the inventive shutter device according to another embodiment in the closed state. A shutter substrate 101 has a central portion formed with a lens aperture 102 and a pair of upper and lower peripheral portions disposed symmetrically to each other with respect to the center of the aperture 102. A left lower shaft pin 103 and a right lower shaft pin 104 are disposed in spaced relation to each other on the lower peripheral portion of the substrate 101. A left dominant blade or left opening-forming blade 105 is supported rotatably by the left lower shaft pin 103. A right dominant blade or right opening-forming blade 106 is supported rotatably by the corresponding right lower shaft pin 104. These pair of opening-forming blades 105 and 106 constitute a first blade group, and are positioned in partly overlapping relation to each other over the central portion of the lens aperture 102 in the closed state. They are slidable away from the aperture 102 in the opposite directions. They are separated from each other during the course of the opposite angular sliding to form therebetween an effective opening. Namely, the pair of opening-forming blades 105 and 106 cooperate to determine the effective opening size. The left opening-forming blade 105 is formed with a slot 107, and the right opening-forming blade 106 is formed also with a slot 108. These slots 107 and 108 overlap with each other and engage with a common lower operating pin 109. The operating pin 109 moves along a path indicated by the arrow A to rotate the pair of blades 105 and 106 in the opposite directions. The lower operating pin 109 is held in the initial position in the closed state shown in FIG. 5A.

A left upper shaft pin 110 and a right upper shaft pin 111 are disposed in spaced relation from each other on the upper periphery of the substrate 101. A left supplementary blade or left aperture-covering blade 112 is rotatably supported by the left upper shaft pin 110, and a right supplementary blade or right aperture-covering blade 113 is rotatably supported by the right upper shaft pin 111. These pair of aperture-covering blades 112 and 113 constitute a second blade group, and they are disposed on peripheral sections of the aperture 102 in the closed state so as to cover a periphery of the aperture 102 no covered by the opening-forming blades 105 and 106. Namely, the pair of aperture-covering blades 112 and 113 supplement the pair of opening-forming blades 105 and 106. The left aperture-covering blade 112 is formed with a slot 114, and the right aperture-covering blade 113 is formed with a slot 115. These slots 114 and 115 are superposed with each other to engage with a common upper operating pin 116. As shown in the figure, the upper operating pin 116 moves along a path indicated by the arrow B to angularly displace the pair of aperture-covering blades 112, 113 in the opposite directions. In the closed state, the upper operating pin 116 is held in the initial position. The pair of aperture-covering blades 112 and 113 are angularly shifted in symmetrical relation to each other. The pair of blades 112 and 113 have the symmetrical shape to each other, thereby saving an actual number of components in the device. Likewise, the pair of opening-forming blades 105, 106 have the symmetrical shape to each other. However, the distance between the separated shaft pins is set greater for the aperture-covering blades than for the opening-forming blades, because the angular displacement of the aperture-covering blades is set smaller between the closed state an the open state than that of the opening-forming blades. Further, various components related to the aperture-covering blades are arranged generally symmetrically to those related to the opening-forming blades with respect to a center of the lens aperture.

FIG. 5B is another front plan view of the same shutter device in the open state. The lower operating pin 109 is displaced downward as indicated by the arrow A to reach the final position. By this operation, the left opening-forming blade 105 is rotated clockwise around the left lower shaft pin 103 to stay on the right side periphery of the substrate. In similar manner, the right opening-forming blade 106 is rotated counterclockwise around the corresponding right lower shaft pin 104 to stay in the left side periphery of the aperture 102.

The upper operating pin 116 also moves concurrently with the lower operating pin 109 along the path indicated by the arrow B downward to reach the final position. By this operation, the left aperture-covering blade 112 is rotated clockwise around the corresponding left upper shaft pin 110 to stay on the left side periphery of the substrate. In similar manner, the right aperture-covering blade 113 is rotated counterclockwise around the corresponding right upper shaft pin 111 to thereby stay on the right side periphery of the substrate. Consequently, the four blades are removed completely from the aperture 102 to open the aperture 102.

Figure 6A:
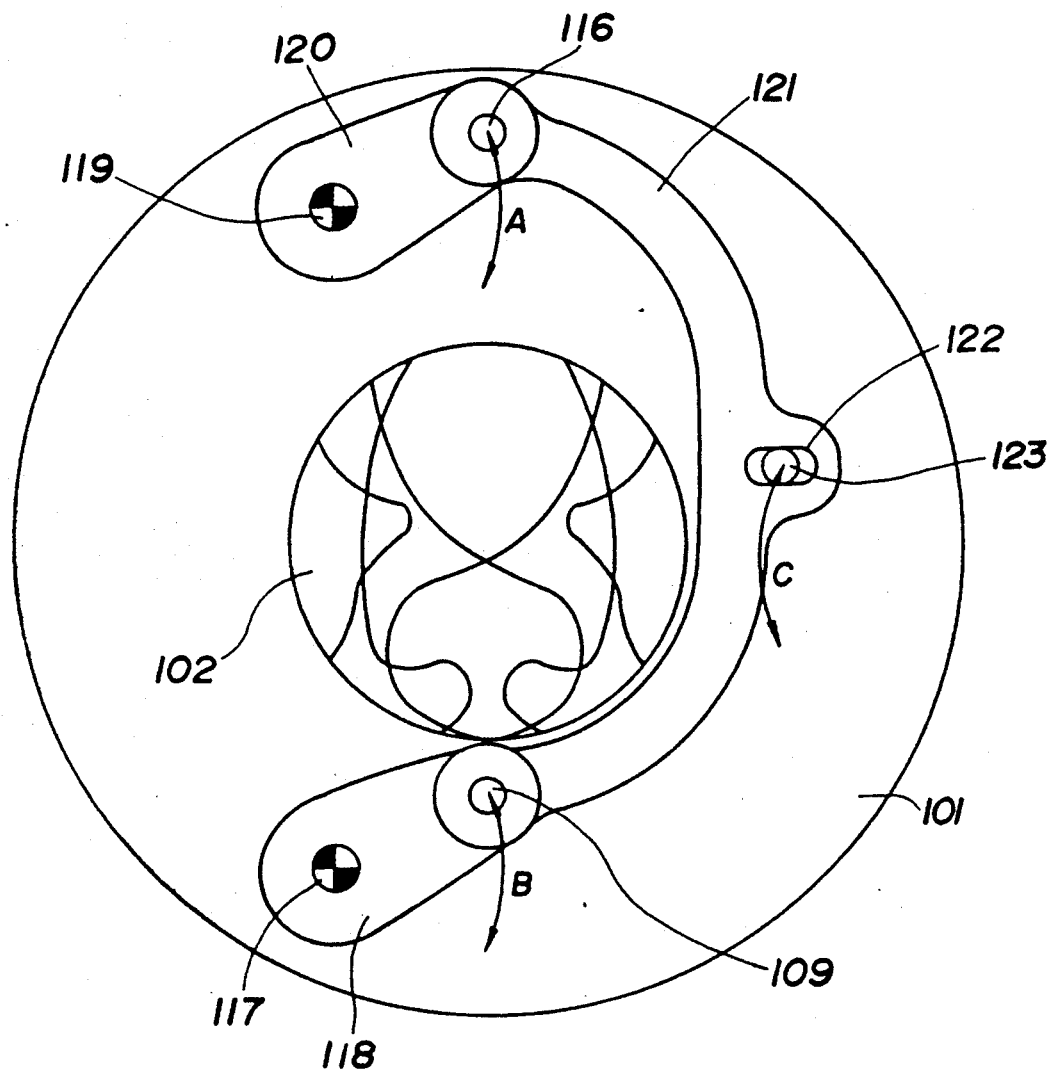
FIG. 6A is a rear plan view of the same shutter blade device in the closed state.

FIG. 6A is a rear plan view of the same shutter device in the closed state, i.e., viewed from the back side of the substrate 101 shown in FIG. 5A. A lower pivot pin 117 is disposed on the lower periphery of the substrate 101. A lower operating lever 118 is pivotably supported by the lower pivot pin 117. The lower operating pin 109 is fixed to a top end of the lower operating lever 118. As described before, the lower operating pin 109 extends through the substrate 101 to project from the front surface of the substrate so as to engage with the slots 107 and 108 formed in the pair of opening-forming blades 105 and 106, respectively. The lower operating pin 109 also projects oppositely to the blades.

An upper shaft pin 119 is disposed on the upper periphery of the substrate 101. An upper operating lever 120 is rotatably supported by the upper shaft pin 119. The upper operating pin 116 is fixed to a top end portion of the upper operating lever 120. As described before, the upper operating pin 116 extends through the substrate 101 such as to project from the front surface of the substrate such as to engage with the slots 114 and 115 formed in the pair of aperture-covering blades 112 and 113, respectively. The upper operating pin 116 projects oppositely to the blades. A link member 121 is engaged between the projections of the lower and upper operating pins 109 and 116. The link member 121 has a generally arcuate shape. The link member 121 is formed at its intermediate portion a slot 122. A drive pin 123 is inserted into the slot 122. The drive pin 123 moves along a path indicated by the arrow C. The drive pin 123 is held at an initial position along the movement path in the closed state. These lower and upper operating levers 118, 120 and the link member 121 constitute a parallel link operating mechanism. The operating levers 118 and 120 are actuated through the parallel link. When the drive pin 123 is held at its initial position, the operating pins 109 and 116 are also held in their initial position.

Figure 6B:
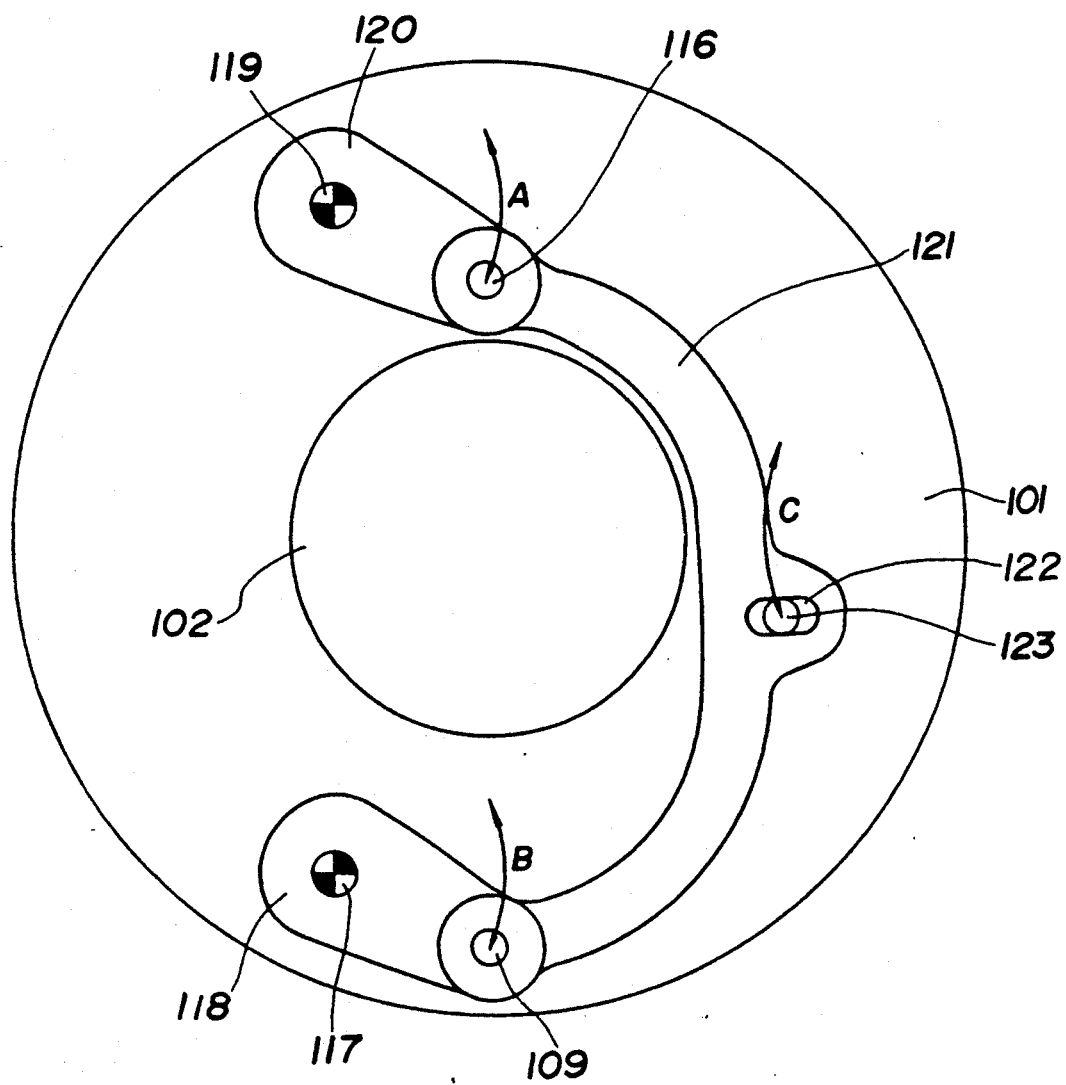
FIG. 6B is another rear plan view of the same shutter blade device in the open state.

FIG. 6B is a rear plan view of the same shutter device in the open state, i.e., viewed from the back side of the substrate shown in FIG. 5B. The four blades are completely removed from the aperture 102. In the open state, the drive pin 123 is moved along the path indicated by the arrow C to reach its final position. By this movement, the lower operating pin 109 is displaced to its final position so that the pair of opening-forming blades 105 and 106 or the leading blades are rotated in the opposite directions to leave the aperture 102. Concurrently, the upper operating pin 116 is displaced to its final position so that the pair of aperture-covering blades 112 and 113 or trailing blades are rotated in the opposite directions to leave the aperture 102.

As understood from FIGS. 6A and 6B, the operating mechanism of the parallel link type is stored on the arcuate peripheral portion of the substrate 101. Further, as shown in FIG. 5B, the four shutter blades are stored along the annular peripheral portion of the substrate in the overlapping relation with one another. Accordingly, the inventive shutter device has a quite compact shape and outer dimension.

Figure 7A:
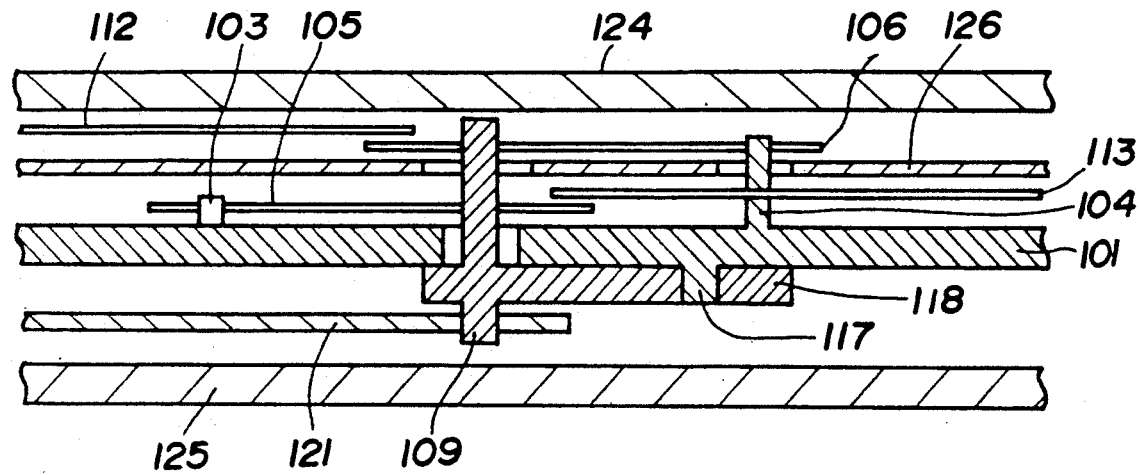
FIG. 7A is a sectional view of the same shutter blade device, taken along the line connecting an operating pin and a rotational shaft.

FIG. 7A is a sectional view of the shutter device, taken along the line passing through the operating pin 109 of the lower operating lever 118 and the pivot pin 117. The substrate 101 is covered with a shutter frame 124 on the front side and covered with a link guide plate 125 on the rear side. A flat spacing between the substrate 101 and the shutter frame 124 is divided by an intermediate partition plate 126 to define a double layer of two parallel blade compartments. Each of the compartments receives a set of two blades which are superposed to each other in the open state. Namely, one of the compartments adjacent to the shutter frame 124 receives a set of the leading blade 106 and the trailing blade 112 which are shifted leftward from the aperture 102. The other compartment adjacent to the substrate 101 receives another set of the leading blade 105 and the trailing blade 113 which are shifted rightward from the aperture 102. The four blades are divided into the two sets and separately stored to avoid interference or jam thereamong during the course of sliding movements. Particularly, the respective compartment receives a set of the two blades moved in the same direction, thereby reducing possibility of interference or jam within the blade compartment. The pair of shaft pins 103 and 104 are erected on the front surface of the substrate 101. The shaft pin 103 rotatably supports one opening-forming blade 105, and the other shaft pin 104 rotatably supports the other opening-forming blade 106. The pivot pin 117 is erected on the rear surface of the substrate 101, and the operating lever 118 is pivotably supported by the pivot pin 117. One end portion of the operating pin 109 is engaged with the pair of opening-forming blades 105 and 106, and the other end portion of the operating pin 109 is engaged with the link member 121. The link member 121 is interposed between the substrate 101 and the link guide plate 125. The opposite faces of the link member 121 can be slidably supported by guide members so as to avoid floating of the link member 121.

Figure 7B:
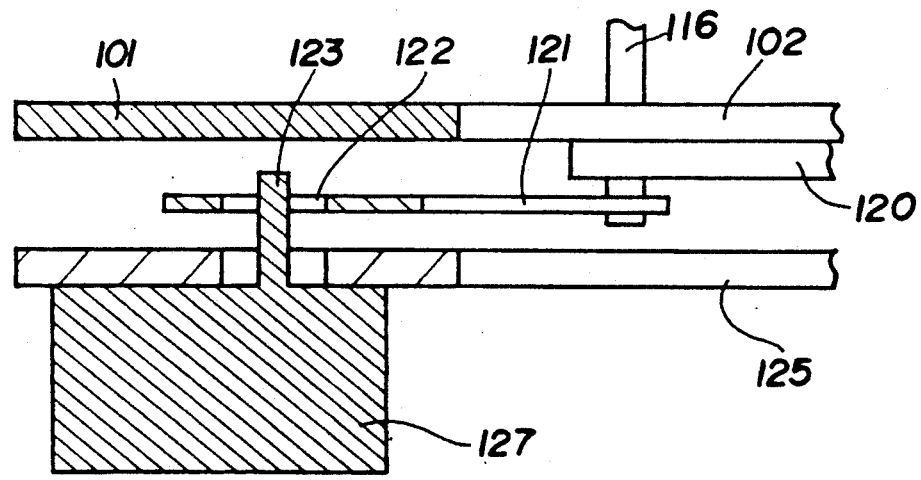
FIG. 7B another sectional view of the same shutter blade device, taken along the line connecting a center of the aperture and a driving pin.

FIG. 7B is another sectional view of the shutter device, taken along the line passing through the drive pin 123 and the center of the lens aperture 102. The drive pin 123 extends through the link guide plate 125 to penetrate into the slot 122 of the link member 121. The drive pin 123 is directly coupled to a drive source 127 mounted on the link guide plate 125. The drive source 127 can be comprised of a stepping motor or a moving magnet actuator. The drive source 127 is preferably of small size such that the drive source 127 can be mounted within the annular periphery of the substrate 101. In this embodiment, the drive pin 123 acts on the link member 121 to drive the pair of operating levers 118 and 120. Otherwise, the drive source may act on one of the operating levers to drive the other operating lever through a link member.

What is claimed is:

1. A shutter device having four blades disposed in overlapping relation to each other and comprised of a pair of dominant blades effective to cover a dominant part of an aperture and another pair of supplementary blades effective to cover the remaining part of the aperture, comprising:

a substrate having a central section formed with the aperture and a pair of peripheral sections disposed in symmetrical relation to each other with respect to the aperture;

first support means disposed on one of the peripheral sections for rotatably supporting a first group of two blades selected from the four blades on the substrate;

second support means disposed on the other of the peripheral sections for rotatably supporting a second group composed of the two remaining blades on the substrate; and operating means disposed on the substrate for operating the first and second groups of blades simultaneously with each other to slide the four blades relative to the aperture to thereby effect opening and closing of the aperture.

2. A shutter device according to claim 1; wherein the first support means has a common support member for rotatably supporting a first group composed of one dominant blade and one supplementary blade to enable the first group to slide away from the aperture in one direction, and the second support means has another common support member for rotatably supporting a second group composed of the other dominant blade and the other supplementary blade to enable the second group to slide away from the aperture in another direction.

3. A shutter device according to claim 1; wherein the first support means has a pair of support members spaced from each other for rotatably supporting a first group composed of the pair of dominant blades to enable the dominant blades to slide away from the aperture in opposite directions, and the second support means has another pair of support members spaced from each other for rotatably supporting a second group composed of the pair of supplementary blades to enable the supplementary blades to slide away from the aperture in opposite directions.

4. A shutter device according to claim 1; wherein the operating means includes a first operating lever for operating the first group of blades, a second operating lever for operating the second group of blades, and a link member for coupling the first and second operating levers to each other.

5. A shutter device according to claim 4; wherein the operating means includes a drive source for directly acting on the link member to drive the same.

6. A shutter device according to claim 4; wherein the substrate has one major face on which the four blades are arranged and an opposite major face on which the operating means is arranged, and including a guide member provided for suppressing floating of the link member from the opposite major face.

7. A shutter device according t claim 1; including means defining a pair of blade compartments superposed on each other in a double layer structure such that one of the blade compartments receives therein a set of two blades slidable away from the aperture in one direction and the other of the blade compartments receives therein another set of two blades slidable away from the aperture in another direction.

8. A shutter device according to claim 2; wherein the operating means includes a pair of pivotable operating levers for operating the respective groups of blades, each operating lever having a pivot pin eccentrically deviated from the corresponding common support member of the dominant and supplementary blades so as to differentiate slide angles of the dominant and supplementary blades.

* * * * *